United States Patent [19]

Kato

[11] 4,108,287

[45] Aug. 22, 1978

[54] DOUBLE-CYLINDER BUFFER

[75] Inventor: Tetuo Kato, Yokohama, Japan

[73] Assignee: Tokico Ltd., Japan

[21] Appl. No.: 784,776

[22] Filed: Apr. 5, 1977

[30] Foreign Application Priority Data

Apr. 10, 1976 [JP] Japan .................................. 51-40614

[51] Int. Cl.² ............................................... F16F 9/32
[52] U.S. Cl. ...................................... 188/315; 188/318
[58] Field of Search ............... 188/269, 275, 282, 315, 188/318, 322

[56] References Cited

U.S. PATENT DOCUMENTS

| 2,107,974 | 2/1938 | Bechereau et al. | 188/318 |
| 2,163,253 | 6/1939 | Binder et al. | 188/315 |
| 3,203,511 | 8/1965 | Long | 188/315 |
| 3,513,947 | 5/1970 | Duckett | 188/269 |

*Primary Examiner*—Duane A. Reger
*Attorney, Agent, or Firm*—Wenderoth, Lind & Ponack

[57] ABSTRACT

A buffer includes an actuation cylinder filled with oil, a piston rod extending through the upper end of the cylinder for vertical movement in the cylinder, a piston provided at the lower end of the piston rod in sliding contact with the inner wall of the cylinder and having a damping action producing mechanism. The piston divides the interior of the cylinder into upper and lower chambers. An outer cylinder is disposed about the cylinder in a peripherally spaced relationship therewith to define a reservoir chamber therebetween, the upper portion of the reservoir chamber being filled with gas and the lower portion of the reservoir chamber being filled with oil. A passage communicates the lower oil filled portion of the reservoir chamber with the lower chamber of the cylinder. A passage communicates the upper gas filled portion of the reservoir chamber with the upper chamber of the cylinder through the outer periphery of the piston rod. A valve is provided in the passage communicating the upper chamber of the cylinder with the gas filled portion of the reservoir chamber for only allowing the flow of oil from the upper chamber of the cylinder to the reservoir chamber. The valve includes a first seal for sealable engagement with a rod guide along which the piston rod is guided. The valve further includes a second seal for sealing the interior of the buffer.

4 Claims, 6 Drawing Figures

4,108,287

DOUBLE-CYLINDER BUFFER

BACKGROUND OF THE INVENTION

This invention relates to a buffer or shock absorber for use in the suspension mechanism of a vehicle and more particularly, to a buffer for use in a vehicle suspension mechanism of the type including a double-walled cylindrical structure which includes an inner or actuation cylinder the interior of which is sealably filled with oil, and an outer cylinder which surrounds the inner cylinder in peripherally spaced relationship thereto and a portion of which is sealably filled with compressed air and another portion of which is sealably filled with liquid. In this type of buffer, it is necessary that air trapped in the actuation cylinder as the result of aeration generated while the vehicle is running or while the buffer is operating be recycled to the annular space defined between the actuation cylinder and outer cylinder. On the other hand, at the downstroke of the piston of the actuation cylinder, since the pressure within the outer cylinder increases somewhat at such a time, the air should be prevented from entering the actuation cylinder.

In order to obtain such functions, there has been proposed and practically employed a type of buffer including an inner or actuation cylinder filled with hydraulic fluid and including a piston for slidable movement within the cylinder, and a piston rod having a lower end to a piston and an upper end extending beyond the upper end of the cylinder. An outer cylinder surrounds the actuation cylinder in a peripherally spaced relationship thereto to define an annular oil reservoir therebetween. The reservoir has an opening at the lower end thereof in communication with the lower end of the actuation cylinder. The upper portion of the outer cylinder is filled with air under pressure and includes means which allows the hydraulic fluid in communication with the upper end of the actuation cylinder to enter the oil reservoir, but which prevents the fluid from flowing from the oil reservoir to the actuation cylinder.

Furthermore, an improvement of the above-mentioned buffer has been proposed and practically employed in a buffer. The improvement includes a seal at the upper end of the actuation cylinder through which the piston rod extends, a recess defined between a piston rod guide and a seal support in communication with the upper end of the oil reservoir, one or more passages defined between the piston rod and seal and extending inwardly toward the recess in communication with the upper portion of the actuation cylinder, and a resilient valve member received within the recess. The valve member is adapted to resiliently deform to close the end or ends of the associated passage or passages so as to provide a flow of fluid in one direction when any excessive pressure is present in the cylinder.

In any one of the above-mentioned prior art buffers, there is provided one of various one-way valves in the narrow passage which communicates between the actuation cylinder and outer cylinder. However, such one-way valves have disadvantages in that the valves can not be easily mounted in the narrow passage and that the valves are complicated in construction and, accordingly, are expensive. Furthermore, since the seal is designed to withstand a high pressure produced by the damping action produced during the operation of the buffer, such a seal inevitably has a complicated construction, and the seal has a very short service life.

SUMMARY OF THE INVENTION

Therefore, one object of the present invention is to provide a buffer which can effectively eliminate the disadvantages inherent in the prior art buffers and which has a relatively simple construction.

Another object of the present invention is to provide a buffer which can be assembled in a simple manner.

Another object of the present invention is to provide a buffer which includes an improved seal arrangement having a relatively simple construction and a relatively long service life.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

DETAILED DESCRIPTION OF THE INVENTION

Figure 1:
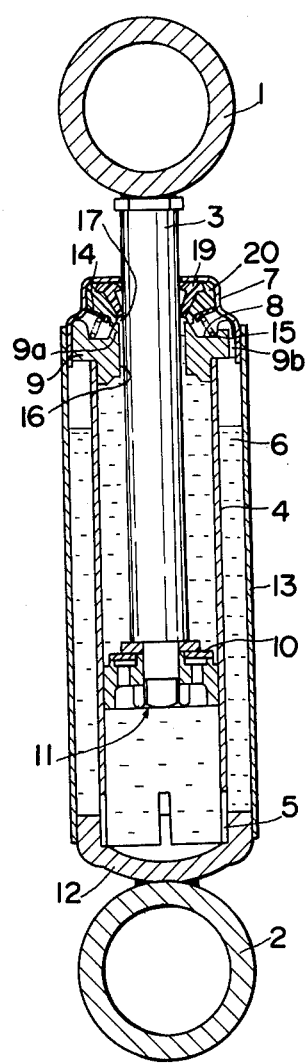
FIG. 1 is a vertical sectional view of a first embodiment of a buffer constructed in accordance with the present invention.

The present invention will now be described while referring to the accompanying drawings, and more particularly to FIGS. 1 and 2 thereof which show a first embodiment of the buffer of the invention. In these Figures, reference numerals 1 and 2 denote upper and lower eyes for attachment to the upper and lower ends of the spring system of the suspension mechanism in a vechicle. The upper eye 1 is secured to the upper end of a piston rod 3 and the other or lower end of the piston rod 3 is provided with a piston 11 which has a conventional resilient disc valve 10 which is adapted to produce a damping action in opposite directions as the piston rod 3 is extended out of and retracted into a cylinder of which description will be made hereinbelow. The piston 11 is adapted to slidably move upwardly and downwardly within the interior of an oil filled actuation cylinder 4 in slidable contact with the inner wall of the cylinder 4 and divides the cylinder interior into upper and lower chambers. The upper end of the cylinder 4 is sealed by an annular rod guide 9 through which the piston rod 3 is guided. The lower end of the cylinder 4 is fitted and held in position within a seal cap 12 which is in turn secured to the lower eye 2. The lower end face of the cylinder 4 is formed with a plurality of circumferentially spaced notches which define passages 5. The passages 5 communicate between the interior of the cylinder 4 and the interior or reservoir chamber 6 of an outer cylinder 13 which is disposed about the actuation cylinder 4 in a peripherally spaced relationship thereto and which sealed at the lower end by the seal cap 12. The upper end of the outer cylinder 13 is sealably supported by the depending periphery of a packing cap 7 which also holds the rod guide 9 in position. The packing cap 7 includes a seal 28 which is interposed between the packing cap 7 and the rod guide 9 and which comprises two parts 19 and 20 which engage each other. The inner seal part 19 is in sealing contact with the rod 3 and provides the essential sealing action required in the seal 28. The outer seal part 20, which is positioned radially outwardly of the inner seal part 19 and interposed between the inner seal part and packing cap 7 is entirely out of contact with the piston rod 3, and includes a downwardly extending annular projection or flange 21 which engages the valve seat 9a of the rod guide 9 to act as a one-way valve.

The seal 28 is urged upwardly from the rod guide 9 toward the packing cap 7 by a coiled spring 15 interposed between the rod guide 9 and an annular spring holder 14 which supports the outer seal part 20 and which contacts the undersurface of the seal part 20.

The rod guide 9 is provided in the upper surface thereof with an annular recess 8 for receiving the lower end of the coiled spring 15 at a predetermined distance from the seal 28. Valve seat 9a is in the form of an annular ring extending upwardly from the center of rod guide 9. The above-mentioned downwardly extending projection 21 on the outer seal part 20 abuts against the outer surface of the valve seat 9a. The rod guide 9 has a center opening slightly greater than the diameter of the piston rod 3 to thereby define an annular passage 16 about the rod, and the passage 16 communicates the interior of the cylinder 4 with a space 17 defined by the seal parts 19, 20 and rod guide 9. The rod guide 9 is provided in the outer periphery thereof with at least one groove to provide a passage 9b in cooperation with the downwardly extending skirt 7a of the packing cap 7, and the passage 9b communicates the reservoir chamber 6 with a space 18 defined by the outer seal part 20, rod guide 9 and packing cap 7. The spaces 17 and 18 are normally isolated from each other by means of the engagement of center annular projection or valve seat 9a of the rod guide 9 and the projection 21 on the outer seal part 20, which act as a one-way valve for allowing the fluid to flow only in the radially outward direction.

As is well known in the art, the actuation cylinder 4 and the lower portion of the reservoir chamber 6 are filled with oil and sealed, and the upper portion of the reservoir chamber 6 is filled with air or gas under compression and sealed.

In the buffer of the invention, when the piston rod 3 is retracted into the actuation cylinder 4, the oil in the lower chamber of the actuation cylinder 4 is compressed by the piston 11 secured to the lower end of the piston rod 3 whereupon the compressed oil bends the outer periphery of the disc valve 10 of the piston 11 upwardly to provide an annular passage about the disc valve 10 so that the oil under pressure flows into the upper chamber of the cylinder 4 to produce a damping action in the buffer. Also, as the piston rod 3 retracts into the actuation cylinder 4, the pressure on the oil within the lower chamber of the actuation cylinder 4 increases and accordingly, the oil under pressure flows through the passages 5 into the reservoir chamber 6. As the oil flows through the passages 5 into the reservoir chamber 6, the pressure on the compressed air within the upper portion of the reservoir chamber 6 increases accordingly and the air finds its way to the space 18. However, since the one-way valve, formed by the annular projection 21 on the outer seal part 20 seats on the valve seating formed by the center projection 9a of the rod guide 9 acts to interrupt the passage of compressed air from the space 18 to the space 17, the passage 16, and the actuation cylinder 4, the compressed air from the space 18 is deterred from flowing into the actuation cylinder 4.

In a reverse manner, when the piston rod 3 is extended out of the actuation cylinder 4 and the piston 11 is accordingly moved upwardly within the actuation cylinder 4, the oil within the upper chamber of the cylinder 4 is subjected to pressure by the moving piston and flows through the passage 16 into the space 17. As the piston rod 3 is further extended until the space 17 is filled with oil, the oil within the space 17 forces the one-way valve to open and is recycled through the space 18 and passage 9b to the reservoir chamber 6. Simultaneously, the oil within the upper chamber of the cylinder 4 bends the inner periphery of the disc valve 10 downwardly to provide an oil passage along the inner periphery of disc valve 10, and the oil flows downwardly into the lower chamber of the cylinder 4 to thereby provide a damping effect.

In the embodiment described hereinabove, since the temperature of the inner seal part 19 increases due to the heat generated by the sliding contact of the seal part 19 with the rod 3, the illustrated construction is optimum when only the inner seal part 19 is formed of heat resisting material such as fluorine-contained rubber, for example.

Figure 2:
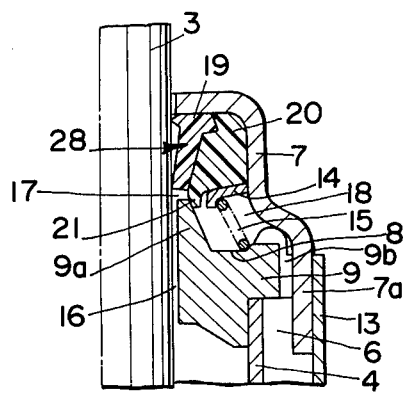
FIG. 2 is a fragmentary sectional view on an enlarged scale of a portion of the buffer of FIG. 1.
Figure 3:
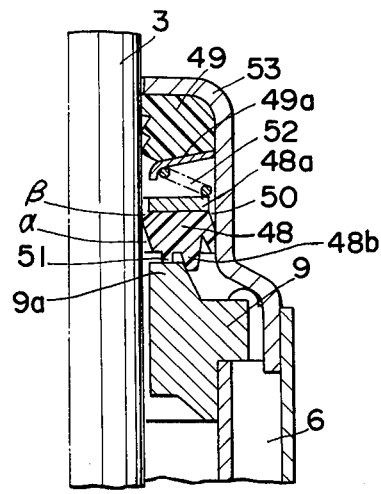
FIGS. 3, 4, 5 and 6 are views similar to FIG. 2, but showing modified embodiments of the present invention.

FIG. 3 shows a second embodiment of the present invention, and this modified embodiment is substantially identical with the embodiment of FIGS. 1 and 2 except that the seal 48 has a piston rod contact part having lower and upper faces disposed at angles $\alpha$ and $\beta$, respectively, with respect to the rod 3. In this case, $\alpha < \beta$. Generally, although the seal having the contact part including such angled faces provides a substantially perfect air or gas seal, the seal can not be expected to perfectly scrape off oil deposited on the piston rod. Therefore, in addition to the seal 48, an additional seal 49 is provided above the seal 48 along the piston rod 3. This seal arrangement is advantageous in that even when the lower seal 48 fails to perfectly scrape off the oil deposited on the piston rod 3, the upper seal 49 perfectly seals the remaining oil deposition on the rod. When sealed by the seal 49 which has a known construction, the oil is recycled through a groove 50 in the outer periphery of the lower seal 48 to the reservoir chamber 6. The body of the seal 48 is positioned in a predetermined spaced relationship to the rod guide 9 by means of a leg 51 integral with the seal body or by other means. Seal 48 has a downwardly extending annular projection 48b which abuts against valve seat 9a of rod guide 9 to thereby form a one-way valve. The lower and upper seals 48 and 49 are biased against the rod guide 9 and packing cap 53, respectively, by the action of a spring 52 disposed between resilient spring holders 48a and 49a respectively. The operation of the modified embodiment is substantially identical with that of the previously described embodiment.

Figure 4:
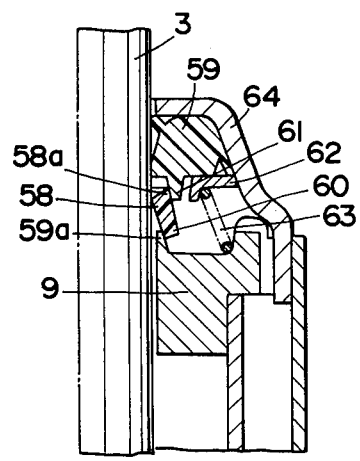

FIG. 4 shows a third embodiment of the present invention. The modified embodiment of FIG. 4 includes a lower seal 58 having a rod contact part including a upper face disposed at an angle to the piston rod 3 and a lower face disposed at an angle smaller than that of the upper face to the rod 3 and a check valve acting piece 60. An upper seal 59 has a contact part including an upper face disposed at an angle to the piston rod 3 and a lower face disposed at an angle smaller than that of the upper face to the rod 3 and a check valve acting piece 61. The upper seal 59 is urged against the packing cap 64 by a spring 63 through a spring holder 62, which spring 63 seats at one end thereof on the rod guide 9. In this embodiment, air is sealed by the seal 58 and oil is sealed by the seal 59. Both the sealed air and oil are temporarily accumulated in a common space and then recycled to the reservoir chamber. When the piston rod is retracted into the actuation cylinder, the valve acting pieces 60 and 61 of the seals 58 and 59, respectively, seat on the valve seat 59a of the rod guide 9 and on the valve seat 58a provided by the seal 58, respectively, to provide a one-way valve. The operation of the buffer of FIG. 4 is substantially identical with that of the previously described embodiments.

Figure 5:
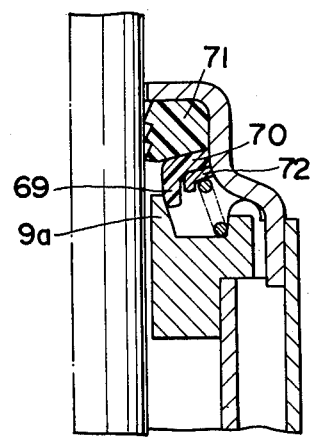

FIG. 5 shows a fourth modified embodiment of the present invention which is substantially similar to the embodiment of FIG. 4. The embodiment of FIG. 5 is different from the embodiment of FIG. 4 in that the seal part 70 having a downwardly extending annular projection 69 which abuts valve seat 9a to form a one-way valve adapted to check the reverse flow of air or gas is held between the seal part 71 and a spring holder 72. This arrangement of FIG. 5 facilitates the mounting of the seal parts.

Figure 6:
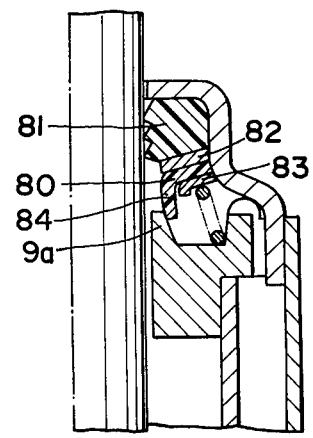

FIG. 6 shows an improvement over the embodiment of FIG. 5. The embodiment of FIG. 6 is different from the embodiment of FIG. 5 only in the fact that the seal part 80, which has a downwardly extending annular projection 84 which abuts valve seat 9a to form a one-way valve adapted to check the reverse flow of air or gas, is held between a spring holder 83 and the seal part 81 through an abutment plate 82 interposed between the seal part 80 and seal part 81.

The operation of the embodiment of FIG. 6 is substantially identical with that of the previously described embodiments.

As mentioned hereinabove, according to the present invention, in each of the various embodiments, the seal comprises two seal parts one of which acts as a check valve for air whereas the other seal part acts as a check valve for oil. Therefore, the construction of the buffer is simple and can be easily fabricated. The service life of the seals can be extended and the seals can be fabricated having a rationalized shape with elements which have their respectively expected functions.

Furthermore, since the seals are provided with check valves, the buffers of the invention are more durable than the prior art buffers in which the rod guide has a check valve at the lower end thereof, because the seals in the buffers of the invention are not subjected to a high dynamic pressure, but only to the pressure damped through the passage 16.

While only several preferred embodiments of the invention have been shown and described in detail, it will be understood that the same are for purposes of illustration only and are not to be taken as a definition of the invention, reference being had for this purpose to the appended claims.

What is claimed is:
1. A double-cylinder buffer comprising:
   an actuation cylinder having a closed lower end and an upper end, said actuation cylinder being filled with oil;
   a piston rod extending into said actuation cylinder through said upper end thereof;
   a piston secured to the lower end of said piston rod, said piston slidably contacting the inner wall surface of said actuation cylinder, said piston dividing the interior of said actuation cylinder into upper and lower oil chambers, said piston having a damping force producing mechanism;
   a rod guide closing said upper end of said actuation cylinder, said rod guide having therethrough an opening through which said piston rod slidably extends, said opening being formed by a surface which is slightly spaced from said piston rod to form a small annular clearance therebetween, said rod guide having an upper surface and an annular projection extending upwardly from said upper surface, said annular projection having a radially outer surface forming a valve seat;
   an outer cylinder coaxially surrounding said actuation cylinder and forming therewith an annular reservoir chamber, said reservoir chamber having closed upper and lower ends, said reservoir chamber having a lower portion filled with oil and an upper portion filled with gas;
   first passage means communicating between said lower oil chamber of said actuation cylinder and said oil-filled lower portion of said reservoir chamber;
   second passage means, including said clearance, extending from said upper oil chamber of said actuation cylinder to said gas-filled upper portion of said reservoir chamber; and
   means, positioned in said second passage means, for causing all oil passing through said clearance from said upper oil chamber to pass into said reservoir chamber, and for preventing gas in said reservoir chamber from passing into said upper oil chamber, said means comprising first seal means sealingly engaging said piston rod at a position above said rod guide, for preventing said oil passing through said clearance from said upper oil chamber from escaping from said second passage means, and second seal means having a downwardly extending flexible annular projection having a radially inner surface which sealingly engages said radially outer valve seat-forming surface of said upwardly extending annular projection of said rod guide, whereby said oil passing through said clearance from said upper oil chamber will deflect said annular projection of said second seal means away from said valve seat and will pass to said reservoir chamber, but whereby gas from said reservoir chamber will force said annular projection of said second seal means against said valve seat and thereby seal said second passage means.

2. A buffer as claimed in claim 1, wherein said first seal means comprises a part in contact with said piston rod, said part being formed by an upper surface extending at a first angle with respect to said piston rod and a lower surface extending at a second angle with respect to said piston rod, said second angle being smaller than said first angle.

3. A buffer as claimed in claim 1, wherein said second seal means is positioned radially outwardly of said first seal means.

4. A buffer as claimed in claim 1, wherein said first seal means has depending downwardly therefrom an annular projection having an inner surface forming a second valve seat, and said second seal means has an upper portion having a radially inner surface contacting said piston rod and a radially outer surface contacting said second valve seat.

* * * * *